UNITED STATES PATENT OFFICE.

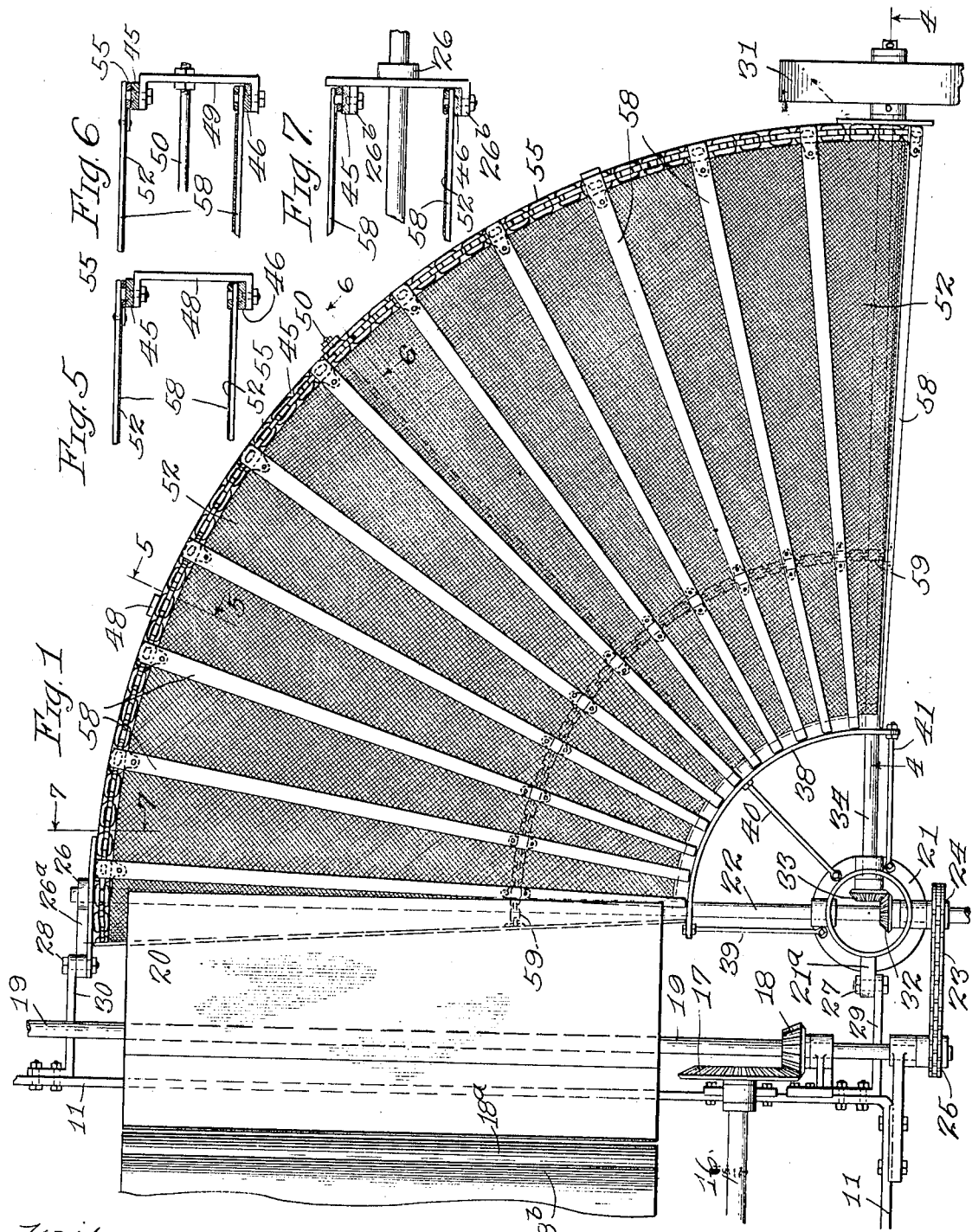

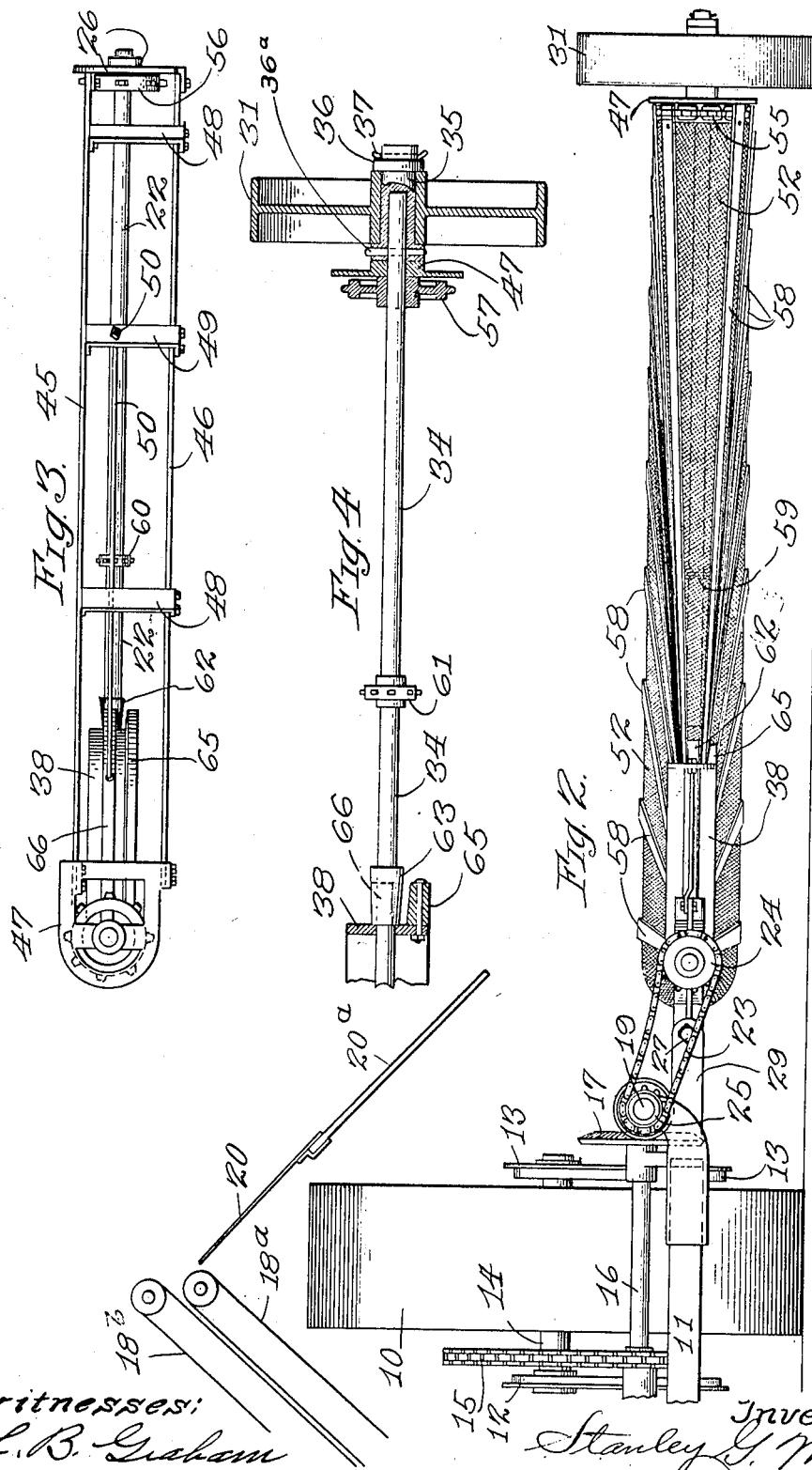

STANLEY G. MILLER, OF ST. PAUL, MINNESOTA.

SWATHING ATTACHMENT FOR HARVESTING-MACHINES.

1,207,065.          Specification of Letters Patent.     Patented Dec. 5, 1916.

Application filed October 8, 1913. Serial No. 793,985.

*To all whom it may concern:*

Be it known that I, STANLEY G. MILLER, a citizen of the United States, residing at St. Paul, in the county of Ramsey and State of Minnesota, have invented certain new and useful Improvements in Swathing Attachments for Harvesting-Machines, of which the following is a specification.

The invention relates to a device adapted for attachment to harvesting machines for swathing grass and the like, and the object of the invention is to produce a device of the character described that is efficient in operation, cheap to manufacture and that may be readily attached to any ordinary commercial harvesting machine for the purpose of delivering a continuous swath of grass or other standing crop from such machine.

Other objects of the invention will appear from the following specification descriptive of the preferred embodiment of the invention of which the accompanying drawings form a part.

In the said drawings, Figure 1 is a plan view of the invention attached to an ordinary grain binder or harvesting machine; Fig. 2 is a rear elevational view of the device showing the detached portions of a harvesting machine to which the same is secured; Fig. 3 is an end view of the attachment with the conveyer belt and the grain wheel removed; Fig. 4 is a detail view partly in section showing a portion of the attachment taken approximately on a line 4—4 of Fig. 1, and Figs. 5, 6 and 7 are sectional views taken on lines 5—5, 6—6, and 7—7, respectively, of Fig. 1.

In the cutting of some forms of grass, such as marsh grass used extensively in the manufacture of fiber, such as grass twine and similar products used in the manufacture of carpets, rugs, furniture and the like, it is desirable to cut the grass and deliver it in a continuous swath in which the plants or stalks all lie approximately parallel with each other and at right angles to the forward line of travel of the machine. In the use of the ordinary mowing or harvesting machine with swathing attachment it has been common to provide swathing means for delivering the cut grass or other material in a continuous swath but with the butts of the stalks unevenly distributed throughout the swath and lying parallel to the line of advance of the machine. This makes it impossible to subsequently properly bunch the cut materials and at the same time retaining the stalks in parallel form, which is quite an essential thing in the handling of cut grass for the making of twine and the various fabrics and the above materials referred to.

The invention as shown and described here is particularly adapted for attachment to ordinary grain binders, and in the drawings the reference character 10 designates the main driving wheel of such a machine.

11 is the ordinary main frame of the machine to which is secured the usual segments 12 and 13 which are adjustably connected with the axle 14 of the main wheel 10. The axle of the main wheel is provided with the usual large driving sprocket over which passes the sprocket chain 15 coöperating with the small driving sprocket on the main driving shaft 16, which latter is provided with the usual face gear 17 meshing with beveled pinion 18 on pitman crank shaft 19 which extends forwardly to the main frame of the machine near the front side thereof for driving the knife of the machine in the usual manner. The above parts of the harvester illustrated and described form no part of the invention and are referred to for the purpose of clearly showing the manner of the attachment of the invention to the ordinary commercial harvesting machine. It will be obvious, therefore, that these parts will vary according to the construction of each individual harvesting machine to which the device is desired to be attached, although the parts referred to are essential to the construction of the ordinary grain binder which is also usually provided with the usual elevator, a portion of which is indicated by the reference characters 18$^a$ and 18$^b$, and is provided with a deck portion 20 upon which the grain or other material being harvested is delivered from the elevators for the purpose of being bound by the ordinary binder attachment. In this class of machine the binder attachment is ordinarily constructed so that it may be removed, and in removing the binder attachment the knotting and packing mechanism are generally detached, together with a portion of the binder deck. This removal of the binder attachment, which is necessary in the use of my invention for swathing grass, makes it necessary to substitute a deck or delivery chute, which may be in the form indicated by the reference character 20$^a$.

The improved swathing device comprises a framework approximately in the form of a segment of a circle or comprising about a quarter of a circle, being given this shape for the purpose of turning the cut grass upon delivery from the elevator of the harvester to a position at approximately right angles to its position upon the binder deck. In the preferred manner of constructing the device, I make use of a suitable casting or housing 21 of irregular shape and provided with bearings for the shafts designed to operate the endless belt canvas, or other means for operatively effecting the swath as it passes over the attachment.

22 is a shaft journaled to rotate in the member 21 and designed, when the attachment is secured in position to a grain binder, to extend approximately parallel with the usual pitman crank shaft 19 of the harvester. Rotation may be given to this shaft in any desired manner, but it is preferred that this be accomplished by means of an endless chain 23 passing over a sprocket 24 on the rear end of shaft 22 and a similar sprocket 25 on a rearwardly extended portion of the pitman crank shaft 19. While this is the preferred manner of driving the attachment, it will be apparent that it may be driven from any convenient moving portion of the usual harvesting machine. The shaft 22 is journaled at its forward extremity in a bearing member 26 forming a portion of the attachment main frame, and both members of the attachment 21 and 26 may be utilized for hingedly connecting the attachment to the harvesting machine. The member 21 is preferably provided with the extension 21ª and the member 26 with a similar extension 26ª, through both of which pass suitable hinge bolts 27, 28 connecting them with brackets 29, 30 suitably secured as by bolts to the main frame 11 of the harvester. This form of hinged connection of the attachment with the harvester frame is desirable as it permits the attachment to move in the vertical direction, the outer end of which is supported by a wheel indicated by the reference character 31, being similar to the ordinary grain wheel supporting the grainward or grassward end of the cutter bar of a harvesting machine. The shaft 22 of the attachment is provided with a beveled gear 32 meshing with a beveled gear 33 secured to a shaft 34 journaled in the frame of the attachment and extending approximately at right angles to the shaft 22 and consequently at right angles to the forward advance of the harvesting machine when the attachment is secured in its operative relation thereto, as indicated in the drawings. The shaft 34 is supported near its inner extremity by a bearing in the member 21. A convenient manner of constructing this shaft is illustrated in detail in Fig. 4 from which it will be seen that the shaft extends continuously to the grain wheel 31 and enters a bushing 35 to which it is fixedly secured by a taper pin 36ª. The bushing 35 may serve as the axle for the grain wheel 31, which latter is secured thereon by any suitable device as the retaining washer 36 and the split key 37. A suitable frame for the attachment and particularly for supporting the movable canvas thereon is provided and this may consist of the curved plate 38 to which is journaled the shafts 22 and 34, the plate being held in fixed relation to the attachment and particularly to the inner member 21 by the anchor rods or bolts 39 to 41 inclusive, which latter are secured at one end to the member 21 and extend radially therefrom to separated points of attachment with the plate 38. The outer periphery of the frame of the swathing attachment may be conveniently made up of the curved straps 45, 46, shown in elevation in Fig. 3, the same extending from the member 26 to a bracket 47, shown in Figs. 3 and 4, the same being journaled over the shaft 34 adjacent the attachment supporting wheel 31.

Both the brackets 26 and 47 may be provided with lugs, as shown at 26ᵇ (Fig. 7) for the attachment of the extremities of the curved guide bars 45, 46. Strength may be given to the frame thus formed in part by the members 45, 46 by employing the spacing braces indicated by the reference character 48, as shown in Figs. 3 and 5. There may be as many of these spacing braces 48 as necessary or desired, and for the purpose of further adding strength to the structure it is preferred that at least one of these members as indicated by the reference character 49 (Figs. 3 and 6) be provided with an opening through which an anchor rod may be passed and securely locked to the brace by suitable nuts, as shown most clearly in Fig. 6, such a rod being indicated by the reference character 50, and anchored at its opposite end in the segmental portion 38 of the frame. The outer curved segmental members 45, 46, in addition to binding the portions of the swathing frame together and strengthening it, are adapted to serve also the functions of guides for the endless belt, which is shown in Figs. 1, 2, 5 and 6, and is indicated generally by the reference character 52. This belt is of peculiar form; it is preferably formed of cloth, as a good strong grade of canvas duck or similar material. In order to enable this belt to conform to the shape of the driving means the belt must be given a general curved form, and in order to strengthen it and give it positive motion it is preferred that it be provided on its outer periphery with an endless metallic sprocket chain 55. For the purpose of giving positive movement to the chain 55 the driving shafts 22 and 34 are both provided with toothed sprockets 56 and 57 respectively.

In order to make the endless belt 52 effective it is preferably provided with a plurality of slats made of suitable material, as wood, and designated by the reference character 58 (Figs. 1, 2, and 5 to 7 inclusive). These slats 58 may be made somewhat narrower toward their converging or inner ends to enable the short end of the canvas to more readily conform to the curved members over which they must pass. It is found desirable to supplement the outer peripheral chain 55 used for driving the outer edge of the canvas by an inner chain extending concentric with the outer chain about one-third of the distance from the inner or shorter side of the canvas, such a chain being indicated by the reference character 59 (Figs. 1 and 2) and being positioned on the under side of the canvas in order that it may engage the sprocket wheels 60 and 61 on the driving shafts 22 and 34, respectively. It will be apparent that the curved shaped belt will necessitate a difference in the size of the driving sprockets 60 and 61 over the outer or peripheral sprockets 56 and 57. At the inside edge of the belt it is preferred that the shafts 22 and 34 be provided with smooth rollers somewhat conical shaped, as indicated at 62 and 63 respectively, for supporting the inner or shorter edge of the canvas but without positive engagement therewith. In order to prevent the sagging of the canvas at the shorter or inside edge adjacent the segmental member 38 it is preferred that the member 38 be provided with a lower guide flange 65 (see Figs. 3 and 4). Sagging of the upper part of the shorter edge of the canvas may be prevented by the use of an upper flange on the member 38, indicated by the reference character 66 (Figs. 3 and 4), being shown in dotted lines in Fig. 4.

The operation of my improved swathing attachment will be readily apparent when the construction is understood.

When attached to a grain binder after the removal of the binding attachment the grain or cut grass being delivered upon the upper binder deck 20 will pass by gravity to the false deck 20ª and thence fall upon the slatted canvas belt 52 of the swathing attachment. At the instant of delivery to the swathing attachment it will be apparent that the stalks of grass or other material to be swathed will lie parallel with the lines of advance of the machine; that is, parallel with the slats of the canvas adjacent the driving shaft 22 of the attachment, but as the shafts 22 and 34 are positively rotated the slats will travel toward the rear of the attachment and by reason of the peculiar travel of the endless belt 52 the stalks of grass or grain will be given a right angle turn so that at the instant of delivery upon the ground immediately after passing over the positively driven shaft 34 at the rear of the attachment the stalks of grass or grain will fall in a continuous swath parallel with the driving shaft 34 or at right angles to the line of advance of the machine so that the resulting swath will be similar in character to a swath produced by the old-fashioned harvesting implement known as the cradle. Inasmuch as the swath will be continuous and the stalks of grass or grain will all lie parallel to each other and at right angles to the longitudinal direction of the swath as well as at right angles to the line of advance of the machine, thus placing the cut stalks of grass or grain in a condition where they may be conveniently gathered into bunches or gavels after properly curing without any danger or necessity of breaking the stalks in handling them, it leaves the material in the best condition for handling and for use in the textile or other manufacturing arts mentioned.

In order that the invention might be understood, the details of the improvement thereof have been shown and described in detail and it is not desired to be limited to the exact details shown for it is apparent that persons skilled in the art may adopt many modifications without departing from the spirit and scope of the invention.

I claim:—

1. The combination with a harvesting machine having a frame and a delivery deck mounted on the frame and extending over one side of the latter, of a quadrantal conveyer frame pivotally mounted at one of its straight edges to said machine frame and extending under said deck; an endless conveyer belt mounted in the conveyer frame and adapted to receive grain dropped from said deck; means operatively connecting the conveyer belt with the machine; and means for supporting the corner of the quadrantal frame which is disposed remotely from the machine frame.

2. A swathing attachment for harvesting machines comprising a quadrantal frame made up of an annular center casting, two concentric arcual portions and rods disposed radially of the frame and securing the center casting and arcual portions in spaced relations; two shafts disposed at substantially a right angle to each other, journaled in said center casting and the outer of said concentric portions; sprocket wheels on said shafts; a curved endless conveyer disposed around said shafts; sprocket chains secured to said conveyer and mounted on said sprocket wheels; and bevel gears connecting said shafts and disposed within the annular center casting.

3. A swathing attachment for harvesting machines comprising a frame made up of an annular center casting and two concentric portions all secured together in spaced relations; two shafts disposed at substantially a right angle to each other, journaled in said center casting and the outer of said concentric portions; sprocket wheels on said shafts; a curved endless conveyer disposed around said shafts; sprocket chains secured to said conveyer and mounted on said sprocket wheels; bevel gears connecting said shafts and disposed within the annular center casting; and two guides on each of said concentric portions supporting the edges of the upper and lower runs of the conveyer between the sprocket wheels.

4. A swathing attachment comprising a frame quadrantal in form and having two concentric portions therein; rods secured to and spacing the concentric portions apart; two guides on each concentric portion; two shafts radiating from the center of said concentric portions and journaled at the ends of the latter; sprocket wheels fixed on said shafts; a curved endless conveyer extending around said shafts and disposed between the guides; slats secured to the conveyer with their ends extending beyond the edges of said conveyer and resting on said guides to support the conveyer; a sprocket chain secured to the ends of the slats at one edge of the conveyer, said sprocket chain being mounted on certain of the sprocket wheels; and a sprocket chain substantially concentric with the first mentioned sprocket chain and secured to the slats and conveyer at a distance from the inner edge of said conveyer, said second sprocket chain being mounted on other of the sprocket wheels.

5. In a swathing attachment for harvesting machines, the combination of a center casting; two shafts radiating from the center casting and each having one end journaled in the latter; a curved endless conveyer substantially concentric with said center casting and passing around said shafts; guides at each edge of the conveyer supporting the latter between said shafts, the other end portions of said shafts being journaled in one of said guides, and one of said shafts being extended through its journal in said guide; and a ground wheel journaled on the extended end of said last mentioned shaft.

In testimony whereof I have signed my name to this specification in the presence of two subscribing witnesses on this 4th day of October, A. D. 1913.

STANLEY G. MILLER.

Witnesses:
 A. J. KEMPIEN,
 A. C. ANDERSON.